Dec. 5, 1961 S. K. MILLSPAUGH 3,011,271

SELECTOR DEVICE ESPECIALLY FOR MONOGRAMS

Filed June 30, 1958 2 Sheets-Sheet 1

INVENTOR

Samuel Kirk Millspaugh

BY Sol Shappirio

ATTORNEY

SELECTOR DEVICE ESPECIALLY FOR MONOGRAMS

Filed June 30, 1958 2 Sheets-Sheet 2

INVENTOR
Samuel Kirk Millspaugh
BY
S. Shappirio
ATTORNEY 3,011,271

SELECTOR DEVICE ESPECIALLY FOR MONOGRAMS

Samuel Kirk Millspaugh, Baltimore, Md., assignor to Samuel Kirk & Son, Inc., a corporation of Maryland Filed June 30, 1958, Ser. No. 745,458
2 Claims. (Cl. 35—53)

This invention relates to selector devices particularly where it is desired to associate two or more indicia selected from series of indicia to give a combined effect, and will be especially illustrated in connection with production of monograms from two or more groups of letters designed to be associated together.

Among the objects of the invention is included relatively inexpensive, simple but effective structures for such selector devices that are easily adapted to present various combinations of indicia or groups of elements.

Other and further objects and advantages will appear from the more detailed description set forth below, it being understood that such more detailed description is given by way of illustration and explanation only, since various changes therein may be made by those skilled in the art without departing from the scope and spirit of the present invention.

In accordance with that more detailed description, the drawings show the following.

Figure 1:
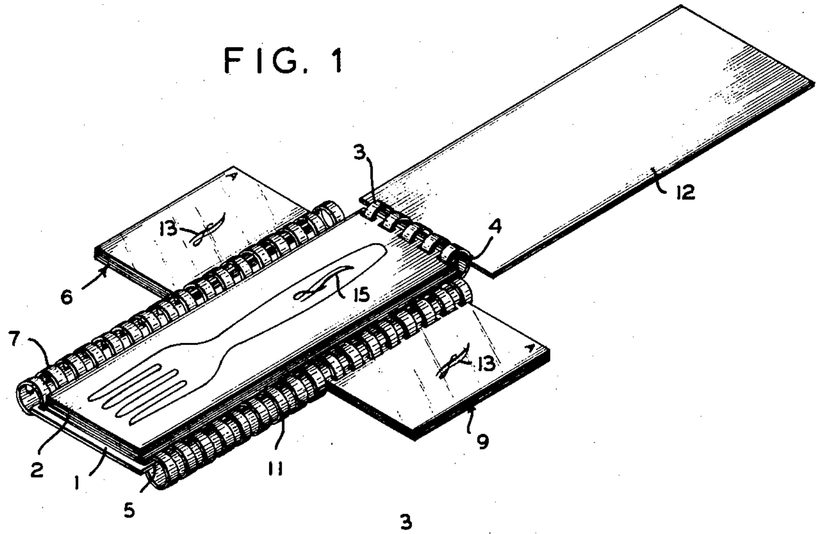
FIGURE 1 is a perspective view of a selector device in open position, in accordance with the teaching of the present invention.
Figure 2:
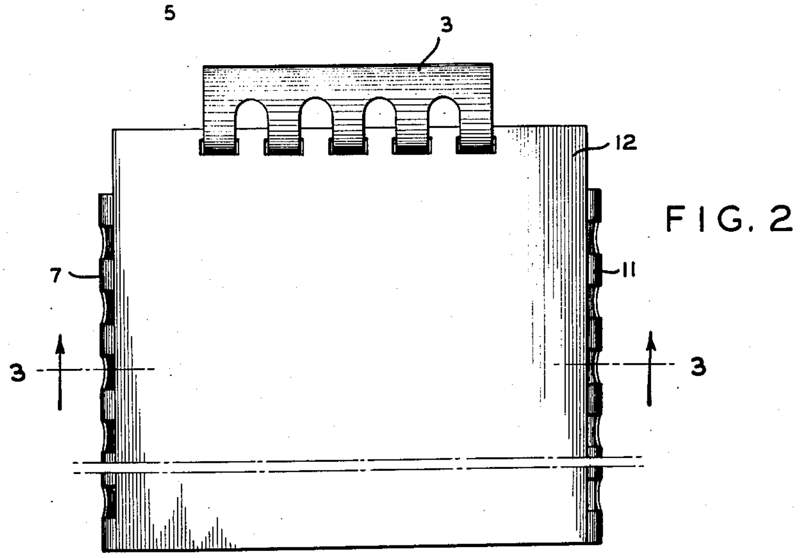
FIGURE 2 is a top plan view thereof.
Figure 3:
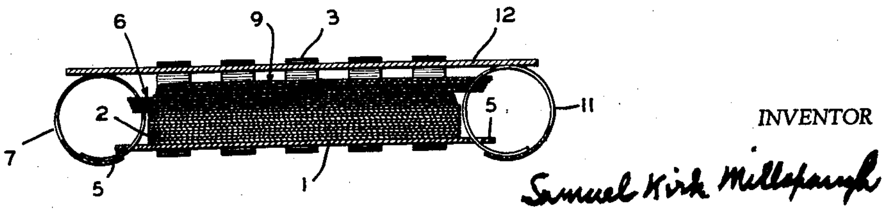
FIGURE 3 is a section on line 3—3 of FIGURE 2.

In accordance with the present invention, a selector device is constructed to be utilized for producing combinations of individual indicia selected from two or more groups of indicia, selections from which are to be associated for producing a combined result or effect. One of the most important uses of such device will illustrate its general purposes, without in any way implying any limitation as to utility, while at the same time adequately exposing its structural features.

Such utility lies in the field of monograms for use on sterling silverware. While heretofore set monogram patterns are generally utilized for selection purposes, it is not feasible to have roughly speaking 17000 monograms for demonstration purposes, and this would be for one style of letter, only. The present invention makes it possible to utilize three sets of cards each carrying a series of letters so that any card of each of the two or three series, or even a single letter if desired, may be displayed in any order of monogram desired for selection purposes.

Accordingly the device uses, for monogramming, a base or any equivalent with three series of cards each series constituting indicia of a group of letters so that each one of cards from two or three of the series may be associated together to demonstrate specifically what appearance will be presented by any selected grouping of letters. A single letter may be displayed, or any selected group of two letters, or any selected group of three letters.

Each of the groups of cards will usually employ initials or letters, peculiarly designed for use with one another. Thus when three letters are used to form a monogram, the center alphabet may be shaped to give a vertical appearance, while the left and right alphabets may be adjusted to give a curved effect in one direction or the other, or may both be straight also. There is evidently a wide latitude of choice. Usually, the center initial will be the larger if used to designate the first letter of the last name. Endless variety of form of letter and of associations are thus possible.

Since the center card usually forms the base of the monogram, it will or may be of opaque stock. The left and right hand cards will usually rest on the center card in any order. While cards may be of such size that they are juxtaposed, it is more convenient to have the left and right hand cards overlie the center card, making the left and right hand cards of transparent paper or other stock material; but preferably transparent plastic is used. In this way the indicia can be more centrally placed on each card.

Each set of cards will desirably be pivoted on an edge of the base. A rectangular or square base is particularly useful for three series of initials, with the center cards mounted on a shorter edge of the base as by a ring binder strip. The left and right series may be similarly mounted on edges adjacent to that of the first short edge, by ring binders. Desirably the center cards are somewhat less in width than the base, so that edge portions of the base are exposed at each side of the center cards, and the left and right series of cards are mounted respectively as by spiral binders on such exposed strips. A very compact, simple and effective device is obtained in this way. The center card may show representation of knife, fork or spoon printed on each card so that the final appearance of the monogram on the silverware will be more closely simulated.

Referring more particularly to the forms illustrated in the drawings, base 1 carries a series of opaque cards 2 mounted by ring binder 3 at the top narrow edge, openings 4 in each card holding the latter on binder 3. The cards are narrower than base 1 so that edges 5 of base 1 are exposed. Left group of cards 6 is mounted by ring binder 7 on left exposed edge 5 of base 1 while right group of cards 9 is mounted on right exposed edge 5 of base 1 by ring binder 11. Cover 12 is also provided, carried on base 1 by the same ring binder 3 that holds the first series of cards 2. Cards 6 and 9 are desirably transparent plastic. Initials 13 are shown left and right cards while larger initial 15 is shown on center card 2. In the view shown in FIGURE 1, the cards are each stacked with the complete alphabet present in order.

Figures 4, 5, 6, 7:
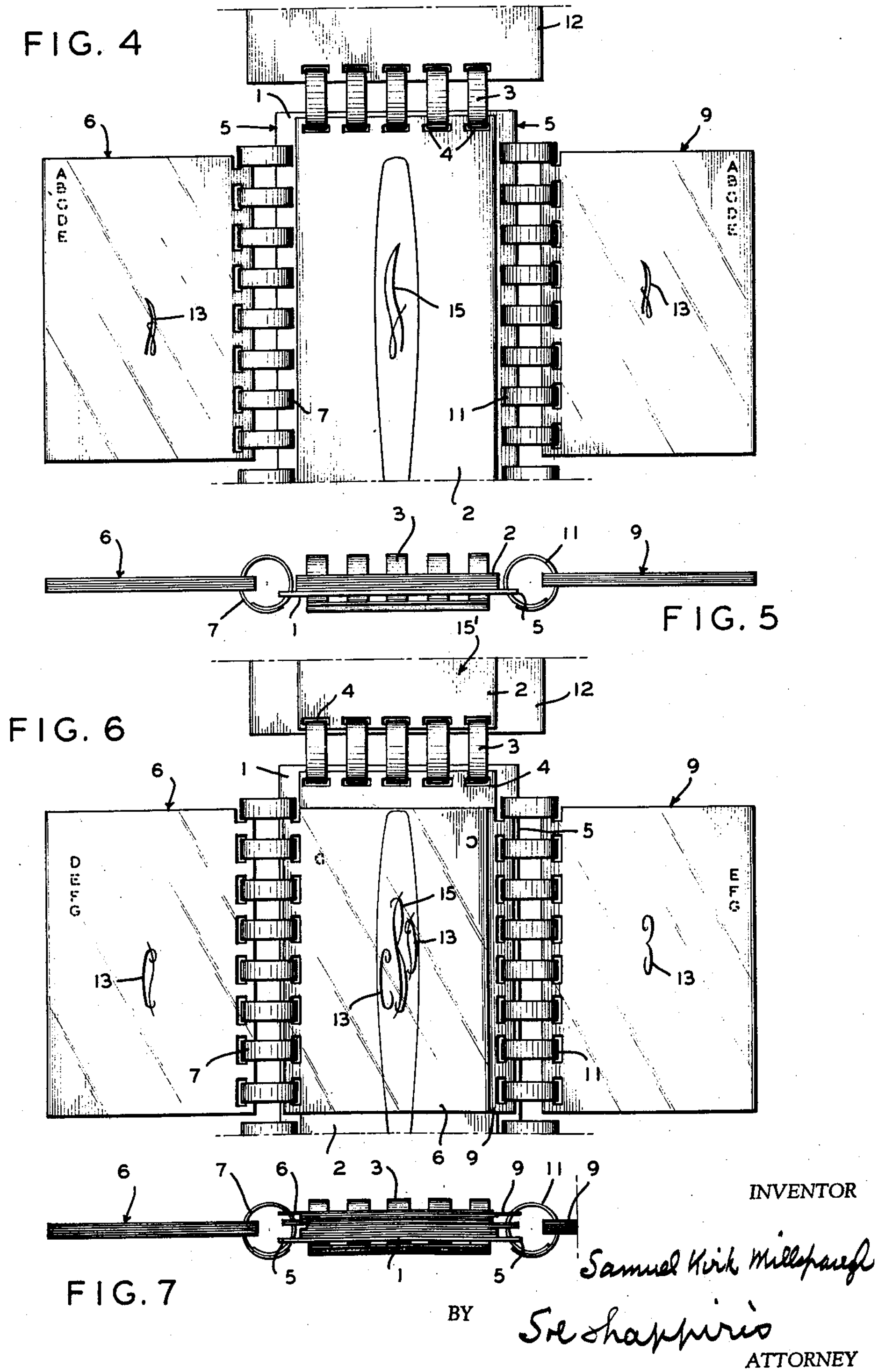
FIGURE 4 is a top plan view of the device in open position ready for use.
FIGURE 5 is an end view of FIGURE 4.
FIGURE 6 is a top plan view of the device in use.
FIGURE 7 is an end view of FIGURE 6.

In FIGURE 6, the monogram CBD is represented. For this the center card shows letter B, the A center card being shown in reverse at 15'. The left cards have been pivoted counter-clockwise to expose C while the right cards have been pivoted to expose D. Any other monogram may be made up in similar fashion.

Each card is of such size, stock and arrangement to expose its own initial without making that of any selected adjacent initial.

While the invention has been illustrated by its application to initials, letters, and monograms, it may be used for any purposes where selection is to be made from any series of indicia useful for representing information or knowledge to be shown. Thus games and educational devices may be built. Or a series of battles may be represented, one series of cards giving dates, another countries involved, and the third, location of the battle.

More than three entities may be associated in this way. For example a hexagonal base could be arranged with five or six triangular cards mounted by binders on the base to be associated for bringing together a group of five items. Other arrangements may be made in an analogous manner.

What I claim is:

1. A monogram selector device for demonstrating variable three-letter monogram combinations, said device including a base and a first group of superimposed separate cards pivotally mounted on one side edge of said base for successive pivoting and exposure on said base, each of said cards carrying a centrally located initial of a monogram to be demonstrated, whereby any card may be selected from said group to expose the central monogram initial appearing thereon, a second group of superimposed separate cards of transparent material each carrying an initial, pivotally mounted on another side edge of said base for successive pivoting and exposure on said base whereby a selected card from said second group may have the initial thereof presented in monogram forming position with respect to the initial of the card selected from the first group, and a third group of superimposed separate cards of transparent material each carrying an initial, pivotally mounted on a different side edge from said second group for successive pivoting and exposure on said base of each of said third group of cards whereby a card selected therefrom may have the initial thereof presented in monogram forming position with the initials of the cards selected from said first and second groups, the initials of the cards of said second and third groups being in oppositely offset relationship with respect to the center line of said first group of cards whereby the initials of the selected cards from the second and third group may be exposed in combination with the central initial of the card selected from the first group in superimposed relationship without masking of the lowermost initial of the monogram thus demonstrated.

2. A monogram selector device as set forth in claim 1 in which the first group of cards is of opaque stock and the second and third groups of cards are of transparent plastic.

References Cited in the file of this patent

UNITED STATES PATENTS

| | | |
|---|---|---|
| 584,761 | Eaton | June 15, 1897 |
| 1,888,839 | Smith | Nov. 22, 1932 |
| 2,075,529 | Leubrie | Mar. 30, 1937 |
| 2,155,924 | Barrett et al. | Apr. 25, 1939 |
| 2,220,527 | Kroner | Nov. 5, 1940 |
| 2,314,790 | Jenter | Mar. 23, 1943 |
| 2,317,673 | Craig | Apr. 27, 1943 |

FOREIGN PATENTS

| | | |
|---|---|---|
| 75,957 | Netherlands | Sept. 15, 1954 |